Nov. 24, 1925.
I. A. WEAVER
JACK
Filed March 5, 1923 2 Sheets-Sheet 1
1,563,001
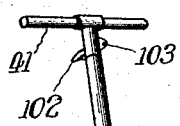
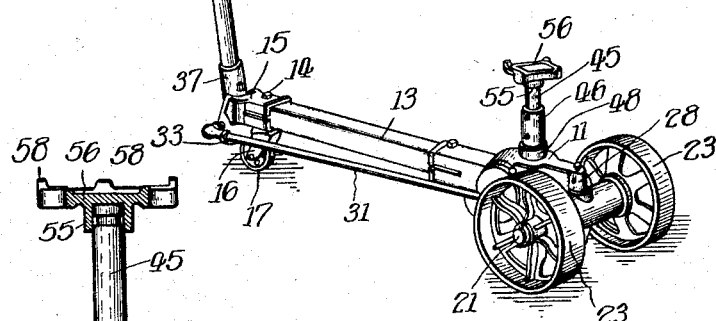
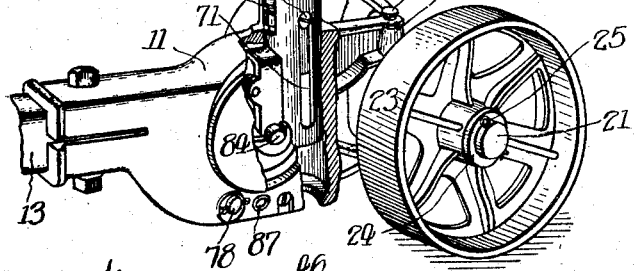

Nov. 24, 1925.
I. A. WEAVER
1,563,001
JACK
Filed March 5, 1923   2 Sheets-Sheet 2
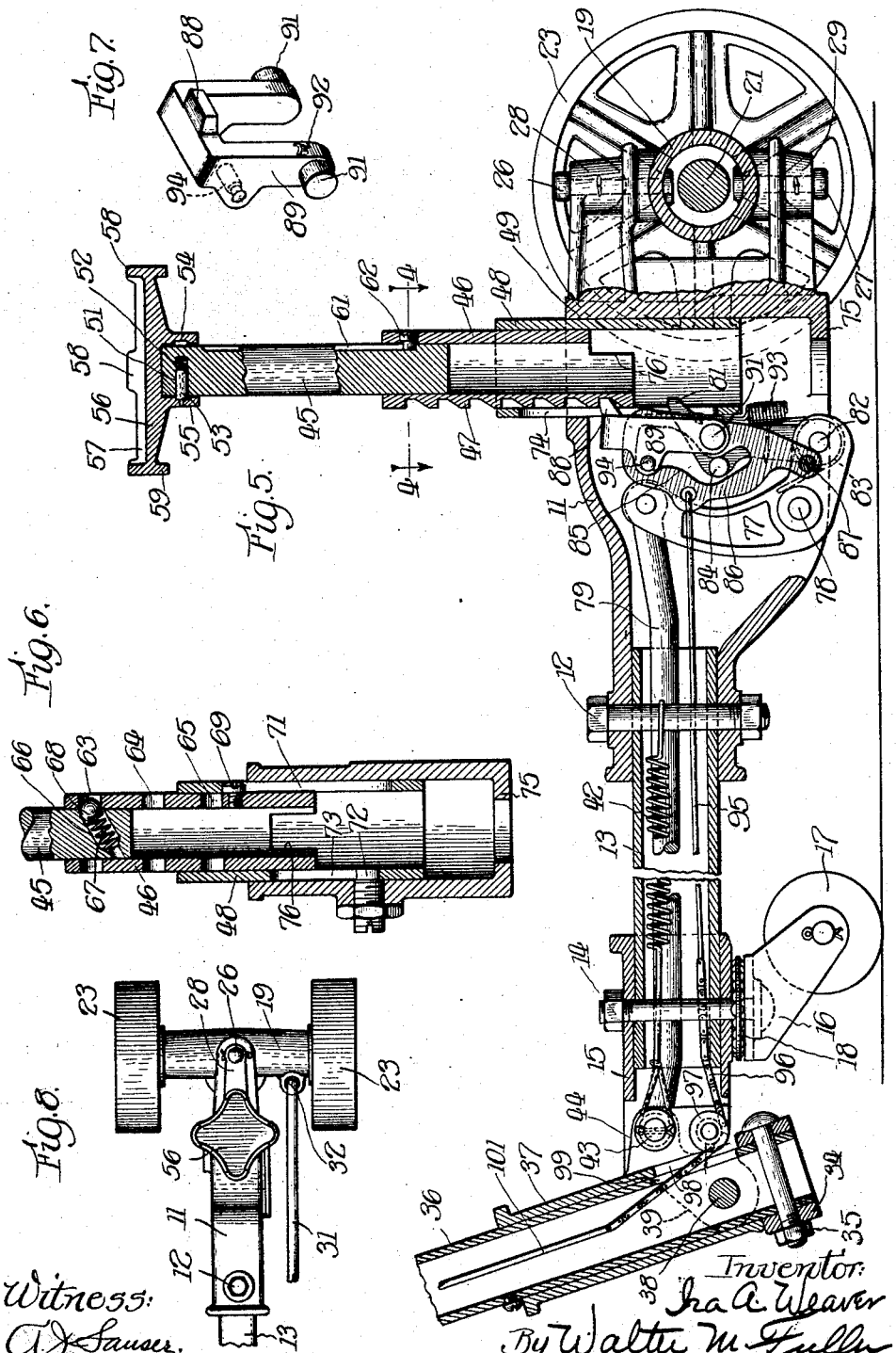

Patented Nov. 24, 1925.

1,563,001

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

JACK.

Application filed March 5, 1923. Serial No. 622,774.

*To all whom it may concern:*

Be it known that I, IRA A. WEAVER, a citizen of the United States, residing at Springfield, in the county of Sangamon and State of Illinois, have invented certain new and useful Improvements in Jacks, of which the following is a specification.

My invention pertains to lifting jacks, such as are more commonly used in connection with automobiles, as in garages, showrooms, etc., and it relates more particularly, but not exclusively, to jacks of the truck type equipped with carrying-wheels whereby the load may not only be elevated, but its position readily changed as by rolling the combined truck and jack along the floor.

A construction of this general form and style has heretofore been patented in the United States Patent No. 1,424,962, Weaver & Stoehr, truck jack, granted Aug. 8, 1922, and the present invention concerns improvements therein.

One object of the invention is to provide a novel and advantageous mounting for the steering-wheels for the truck embodying anti-friction bearings adequately protected from dirt and injury, and, in the preferred embodiment of the invention, the roller-bearings for the axle of such wheels are located inside of the front axle housing, whereby the construction avoids imposing an undue or excessive strain on the bearings when carrying a heavy load over uneven surfaces as is likely to happen when the bearings are located within the wheel-hubs.

Such front axle housing pivots or turns centrally in the steering operation on two aligned upper and lower pins which are held in place by easily removable keys, thus giving a simple and rugged construction well capable of withstanding the rough usage to which an appliance of this kind is subjected, the wheels on such axle being unusually wide and heavy to afford a firm foundation and to facilitate the transportation of the load over uneven floors.

The new construction gives an increased bearing surface for the sectional load-carrying standard against the main body casting, thus permitting the standard to be supported rigidly when up to its maximum height, hence preventing any tendency for the parts to bind under extreme loads.

To accomplish this desirable result, the sectional standard designed to carry the load, and comprising an inner upright shaft and a surrounding sleeve externally equipped with spaced ratchet-teeth, is housed and vertically operable in a sustaining sleeve automatically vertically adjustable in the bearing for these parts in the main casting, the lifting and sustaining pawls coacting with the ratchet-teeth through a slot in the outer sleeve.

Such external sleeve, therefore, constitutes an automatically adjusting bearing which conforms its position to correspond to the extent of elevation of the load-sustaining standard.

The new truck-jack also incorporates certain features of novelty and improvement in the saddle at the top of the standard adapted to engage the load whereby the height of the standard may be easily adjusted by grasping and manipulating the saddle or seat, the construction being such that no crevice offers means for dirt and grease to collect, and the saddle is so designed as to drain off any liquids and prevent them from running down the standard and injuring the interior mechanism of the jack.

In order that those skilled in this art may have a full and complete understanding of this invention and its various structural and functional advantages, I have illustrated, in the accompanying drawings, forming a part of this specification, a desirable and preferred embodiment of the invention, and for simplicity like reference characters have been used for the same parts throughout the several views of such drawings.

In these drawings:—

Fig. 1 is a perspective view of the entire truck-jack;

Fig. 2 is a partial section and partial perspective view of the front portion of the jack;

Fig. 3 is a fragmentary partial section and partial perspective view of the same general portion of the structure;

Fig. 4 is an enlarged horizontal cross section on line 4—4 of Fig. 5, the parts being viewed in the direction indicated by the arrows;

Fig. 5 is a fragmentary, substantially-central, longitudinal vertical section of the device;

Fig. 6 is a fragmentary vertical section through the sectional standard portion of the appliance and at right angles to the section of Fig. 5;

Fig. 7 is a perspective view of the holding or sustaining dog or pawl; and

Fig. 8 is a partial plan view of the jack.

Referring to these drawings, it will be seen that the new appliance includes a main, hollow casting 11 of appropriate shape internally receiving and bolted at 12 to, the front end of a tubular member 13, the rear or other end of which is received in, and bolted at 14 to, a rear-end hollow casting 15, the bolt 14 also fastening to the structure the bracket 16 of a rear castor wheel 17 adapted to turn readily about the vertical axis of the bolt on a ball-bearing 18.

A front axle housing 19, accommodating the revoluble front axle 21, internally at its opposite ends, has roller bearing 22 for the axle, which is free to revolve therein, the opposite protruding ends of such axle being equipped with suitable carrying-wheels 23 held thereon by collars 24 and cotter pins 25, the cylindrical hubs of the wheels overlapping the correspondingly-shaped ends of the axle-housing for the exclusion of foreign matter.

The center of such axle-housing is pivoted by upper and lower aligned pins 26 and 27 to and between vertically-spaced lugs or ears 28 and 29 projecting forwardly from and forming part of the principal casting 11, whereby the steering of the truck-jack may be readily effected by turning the axle-housing and the parts associated with it, including the combined carrying and steering wheels 23, around such central pivoted line.

To provide simple means for performing the steering operation, one side of the axle-housing, by means of a link 31 pivoted thereto at 32 (Fig. 8), is connected pivotally to a lateral arm 33 (Fig. 1) having a hub or collar portion 34 (Fig. 5) bolted at 35 on the lower end of a cylindrical tubular arm 36 mounted for oscillation in a bearing member 37 fulcrumed at 38 between spaced ears 39 of the element 15, whereby such arm may be rocked up and down in a vertical plane and may be turned on its own axis, the latter operation effecting the steering of the truck by cutting the wheels 23 to the right or to the left, or by maintaining them in normal straight-ahead position.

To facilitate the manipulation of such arm or handle 36, the upper end thereof is fitted with a cross-bar or handle 41, and to automatically restore the arm or handle 36 to normal upper position, a coiled contractile spring 42 in member 13 is connected at one end to the bolt 12, its other end being connected to a cross pin 43 mounted in spaced ears or lugs 44 forming part of and outstanding from the member 37.

The standard or post for engaging and lifting the load comprises an inner, vertical, round rod or shaft 45 fitted telescopically in a sleeve 46 equipped externally with a series of vertically-spaced ratchet-teeth 47, such sleeve in turn telescopically fitting in an outer bearing sleeve 48 adapted to slide vertically in a bearing 49 in the casting 11.

Near its top end, shaft 45 has a transverse cylindrical recess 51 accommodating a coiled spring 52 which presses a pin 53 outwardly, the protruding part of which pin is received in an internal annular recess or groove 54 in the lower hub-portion 55 of a seat or saddle member 56 of generally square shape having a top, upstanding, marginal flange 57 with corner enlargements 58, and having a bottom border flange or ledge 59 which drains any liquids away sufficiently so that they will not run down the standard and into the other parts of the mechanism.

The side of shaft 45 has a longitudinal groove 61 receiving and wider than the inner end portion of a stop screw 62 extending through the wall of sleeve 46 into such groove.

In a plane at right angles to the series of ratchet-teeth 47, sleeve 46 has three vertically-spaced holes 63, 64 and 65, and the lower end portion of the rod or shaft 45 has an inclined cavity 66 housing a coiled spring 67 which presses a ball 68 outwardly, the latter normally being accommodated partly in the cavity 66 and partly in one of the holes 63, 64 or 65, as the case may be, the ball thus acting as the means which supports the shaft in the desired position of adjustment in the sleeve 46.

If the shaft 45 is manually raised, the ball automatically recedes into the cavity 66 by reason of the inclination of the latter, permitting such longitudinal shifting of the shaft, and the latter may be turned on its own axis sufficiently, as is permitted by the pin and slot connection 61, 62, to temporarily bring the ball out of register with the series of holes 63, 64 and 65, whereby when the shaft is brought to the proper height it may again be turned to bring the ball into alignment with the holes and permit it to enter the desired one.

Such turning of the shaft may be effected by means of the saddle because of its frictional connection through the spring-pressed pin 53 with the shaft, and yet the saddle is comparatively free to turn on the shaft to permit its accommodation to any load or element which it is to engage.

Thus the shaft may be easily and readily adjusted telescopically in the ratchet-sleeve, the lifting operation being performed through the latter, as will be explained hereinafter.

The ratchet-sleeve 46 has a longitudinal pin and slot connection 69, 71, with the outer bearing sleeve 48 (Fig. 6), and the latter in turn has a pin and slot connection 72, 73, with the main-casting member 11, whereby both sleeves are prevented from turning and the ratchet-teeth of the one are maintained in register with the lengthwise slot 74 of the other, and both are held in operative relation to the lifting and holding pawls or dogs referred to hereinbelow.

As is shown in Fig. 5, the lower part of the casting 11 has a bracing and strengthening flange 75 projecting into the bearing 49, and, to avoid conflict thereof with the ratchet-sleeve 46, the latter is cut away at 76.

A rock arm 77 (Fig. 5) is fulcrumed in the main casting at 78, its longer upper arm being connected by a link 79 to the pin or shaft 43, so that the vertical oscillation of arm or handle 36 brings about a rocking movement of arm 77, as will be readily understood.

A lifting dog or pawl 81 designed to coact with the ratchet-teeth 47 is pivoted at 82 on the shorter arm of the lever 77 and a suitable spring 83 tends to rock the pawl toward the ratchet, but its movement in this direction is limited by reason of a cross pin 84 on the pawl engaging the wall of a cam-shaped recess or hole 85 in a release member 86 fulcrumed in one of the side walls of casting 11 at 87.

The ratchet holding or sustaining dog or pawl 88 forms part of a yoke or U-shaped member 89 (Fig. 7) having opposite outstanding journals 91 in appropriate bearings in casting 11, such element having an attachment 92 for the upper end of a coiled spring 93 whose lower end is secured to the casting 11 so that such holding pawl is normally spring-pulled toward the ratchet-teeth.

Element 89 has an inwardly-extended pin 94 projecting into the hole or aperture 85 of the release member 86, which construction permits this pawl, as well as the companion lifting pawl to be retracted when desired to permit the standard to drop.

A rod or wire 95 connects part 86 to a chain 96 which extends around a sheave 97 on one of the ears 44 and through registering holes 98 and 99 in parts 36 and 37 to the interior of the former, where it is connected to a rod 101 which, at its upper end, is connected to a finger piece 102 pivoted at 103 between ears projecting from that part of the central portion of handle 41 mounted on the main handle or arm 36 and projecting out through a hole in the opposite side of such part.

Thus, by lifting element 102, as may be readily done by one or more fingers of the hand, both pawls may be retracted, provided the load has been removed, and the standard is permitted to drop to its lowermost postion.

The operation of the appliance takes place substantially as follows:

Assuming that the shaft 45 has been adjusted vertically in the ratchet-sleeve to the required height, each time that the handle 36, 41, is rocked down, the lifting pawl 81 is caused to ascend, and as it does so in engagement with one of the ratchet-teeth, both of the parts 45 and 46 will be correspondingly elevated and the load lifted in like degree.

When the handle is permitted to swing up under the action of its spring 42, the lifting pawl or dog will be lowered, the holding pawl in the meantime maintaining the standard and load elevated in the position to which it had been raised by the lifting dog.

Thus the load may be raised step by step by the up and down rocking movement of the handle or arm 36. To lower the load, the operator pulls on the finger piece 102 at the same time that he rocks the handle 36, thereby effecting the desired operation of the release member 86 which co-operates with the two pawls through their pins 84 and 94.

As soon as the load is removed from the saddle, the maintained pull on the element 102 simultaneously retracts both pawls so that the whole standard drops to its limit of downward movement.

Owing to the fact that the lifting and lowering dog 81 rises and descends between the legs of the U-shaped member 89, a greater elevation of the standard may be secured with the same number of ratchet-teeth.

As shown in Fig. 5, the standard is raised to its limit of upward movement and held therein by the retaining or holding pawl or dog 88, the standard having been lifted to this position by the engagement of the lifting-dog 81 with the lower end of the ratchet-sleeve 46.

The invention is not limited and restricted to the precise and exact details of construction presented, because these may be modified within comparatively wide limits without departure from the heart and essence of the invention and without the sacrifice of any of its substantial benefits and advantages.

I claim:

1. In a truck-jack, the combination of a main supporting body, an axle-housing pivoted thereto at its middle, anti-friction bearings in said housing, an axle in said bearings, carrying-wheels on said axle, a jack on said main supporting body, a handle hinged to said main body for vertical rocking movement and constructed to turn on its own axis, operating means for the jack actuated by such rocking movements of the handle, and means connecting the handle to said axle-housing whereby steering of the appliance by swinging the axle-housing on its pivot may be effected by turning said handle on its own axis.

2. In a truck-jack, the combination of a main supporting body, an axle-housing pivoted thereto at its middle, anti-friction bearings in said housing, an axle in said bearings, carrying-wheels on said axle, the hubs of said wheels overlapping the ends of said housing and assisting in preventing the entrance of foreign matter into the housing, a jack on said main supporting body, a handle hinged to said main body for vertical rocking movement and constructed to turn on its own axis, operating means for the jack actuated by such rocking movements of the handle, and means connecting the handle to said axle-housing whereby steering of the appliance by swinging the axle-housing on its pivot may be effected by turning said handle on its own axis.

3. In a lifting-jack, the combination of a supporting-member having a bearing, a bearing-sleeve slidable therein, a load-lifting standard slidable in said bearing-sleeve, means to raise and lower said standard, and means to slide said bearing-sleeve automatically in said bearing during at least a portion of the sliding movement of said standard.

4. In a lifting-jack, the combination of a supporting-member having a bearing, a bearing-sleeve slidable therein, a load-lifting standard slidable in said bearing-sleeve, means to raise and lower said standard, and means to slide said bearing-sleeve automatically in said bearing in part at least by the same operating means which actuates said standard.

5. In a lifting-jack, the combination of a supporting-member having a vertical bearing, a longitudinally-slotted bearing-sleeve slidable in said bearing, a load-lifting ratchet member slidable in said bearing-sleeve pawl means co-operating with the teeth of said ratchet-member and projecting through the slot of said bearing-sleeve, means to operate said pawl means to elevate said ratchet-member step by step, and means to slide said bearing-sleeve automatically in said bearing during at least a portion of the sliding movement of said ratchet-member.

6. In a lifting-jack, the combination of a supporting-member having a bearing, a longitudinally-slotted bearing-sleeve slidable in said bearing, a load-lifting ratchet-member slidable in said bearing-sleeve, retaining and operating pawls projecting through the slot of said bearing-sleeve and coacting with the teeth of said ratchet-member, means to actuate one of said pawls to elevate said ratchet-member step by step, means permitting retraction of said retaining pawl, and means to slide said bearing-sleeve.

7. In a lifting-jack, the combination of a supporting-member having a bearing, a slotted bearing-sleeve slidable in said bearing, a pin and slot connection between said bearing-member and said bearing-sleeve, a ratchet-member slidable in said bearing-sleeve, a pin and slot connection between said bearing-sleeve and said ratchet-member, pawl-means co-operating with the teeth of said ratchet-member and projecting through the slot of said bearing-member, and means to operate said pawl means.

8. In a lifting-jack, the combination of a supporting-member having a vertical bearing, a slotted bearing-sleeve slidable in said bearing, a load-lifting ratchet-member slidable in said bearing-sleeve, means to prevent said bearing-sleeve from turning in said bearing, means to prevent said ratchet-member from turning in said bearing-sleeve, pawl means co-operating with the teeth of said ratchet-member and projecting through the slot of said bearing-sleeve, means to operate said pawl means, and means to slide said bearing-sleeve.

9. In a lifting-jack, the combination of a supporting-member, a lifting-sleeve slidable in a bearing in said member, a lifting-shaft in said sleeve, means to hold said shaft in said sleeve at different positions of adjustment, a saddle revolubly mounted on the top of said shaft, and means between said shaft and saddle possessing sufficient friction whereby the saddle may be used to turn the shaft to effect the desired adjustment of the shaft in the sleeve, the saddle being adapted to turn on the shaft when such friction is overcome.

10. In a lifting-jack, the combination of a supporting-member, a lifting-sleeve slidable in a bearing in said member, a lifting-shaft in said sleeve, means to hold said shaft in said sleeve at different positions of vertical adjustment, a saddle having a socket on its under face receiving the upper end of said shaft, the inner face of said socket-wall having an annular recess, and a spring-pressed pin in a cavity in said shaft pressing outwardly against a wall of said socket-recess whereby the pin prevents removal of the saddle and creates sufficient friction to enable the saddle to be used to turn the shaft.

11. In a lifting-jack, the combination of a supporting-member, a lifting-standard slidable in a bearing in said member, means to operate said lifting-standard, and a saddle on said standard having a flange projecting downwardly from its lower face designed to prevent liquids from running down said standard.

12. In a lifting-jack, the combination of a main supporting body having a bearing, carrying-wheels for said body, a load-lifting standard slidable in said bearing equipped with ratchet-teeth, a holding-pawl co-operating with said ratchet-teeth on a U-shaped mounting having its legs rockingly mounted on said body, a lifting-pawl adapted to operate between the legs of said U-shaped member, means to operate said pawls including a handle rockingly mounted on said body, and a release member operatively associated with both of said pawls.

13. In a lifting-jack, the combination of a main supporting body having a bearing, carrying-wheels for said body, a load-lifting standard slidable in said bearing equipped with ratchet-teeth, a holding-pawl co-operating with said ratchet-teeth on a U-shaped mounting having its legs rockingly mounted on said body, a lifting-pawl adapted to operate between the legs of said U-shaped member, a handle rockingly mounted on said body, means operatively connecting said handle to said lifting-pawl, a rockingly-mounted release-member, operating means for said release member on said handle, and means on both pawls coacting with said release member.

14. In a lifting-jack, the combination of a main supporting body having a bearing, carrying-wheels for said body, a slotted bearing-sleeve slidable in said bearing, a load-lifting standard slidable in said bearing-sleeve and equipped with ratchet-teeth, a holding-pawl on a U-shaped mounting having its legs rockingly mounted on said body co-operating with said ratchet-teeth and extended through the slot of said sleeve, a lifting-pawl coacting with said ratchet-teeth and extended through the slot of said bearing-sleeve and designed to operate between the legs of said U-shaped member, means to operate said pawls including a handle rockingly mounted on said body, a release member operatively associated with both of said pawls, and means to slide said bearing-sleeve.

15. In a lifting-jack, the combination of a main supporting body having a bearing, carrying-wheels for said body, a slotted bearing-sleeve slidable in said bearing, a load-lifting standard slidable in said bearing-sleeve and equipped with ratchet-teeth, a holding-pawl on a U-shaped mounting having its legs rockingly mounted on said body co-operating with said ratchet-teeth and extended through the slot of said sleeve, a lifting-pawl extended through the slot of said bearing-sleeve co-operating with said ratchet-teeth and operative between the legs of said U-shaped member, a handle rockingly mounted on said body, means connecting said handle and lifting-pawl, a release member operatively associated with both of said pawls, means on said handle operatively connected to said release member, and means to slide said bearing-sleeve.

In witness whereof I have hereunto set my hand and seal.

IRA A. WEAVER. [L. S.]